United States Patent Office 3,124,750
Patented Mar. 10, 1964

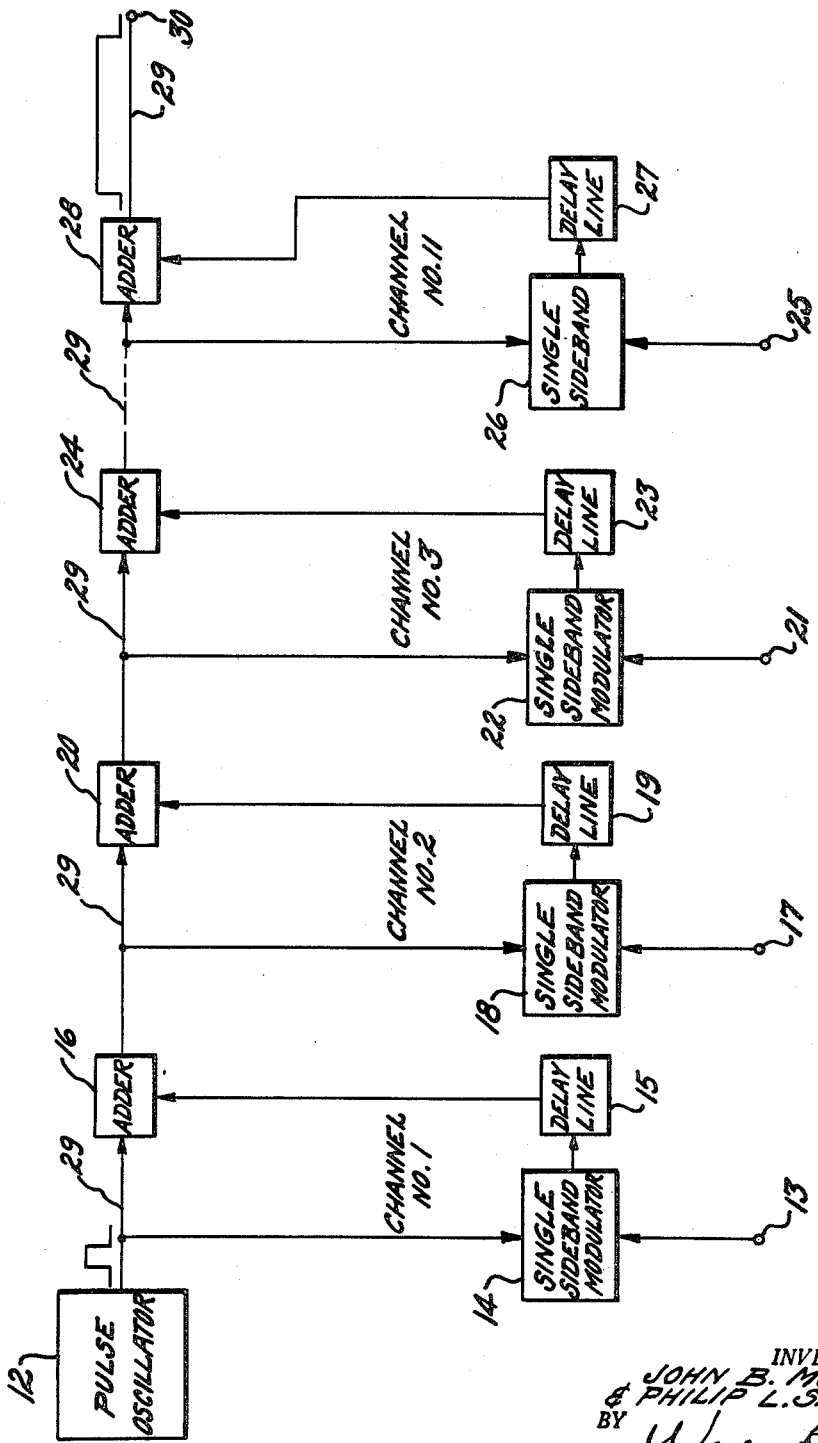
INVENTORS
JOHN B. McLEAN
& PHILIP L. SANDLER
BY
ATTORNEYS

3,124,750
CONTROLLED PULSE WIDTH TRANSMITTER COMPRISING MULTIPLEX INPUTS TO INDIVIDUAL MODULATOR-DELAY MEANS
John B. McLean, Scotch Plains, N.J., and Philip L. Sandler, Rome, N.Y., assignors to the United States of America as represented by the Secretary of the Air Force
Filed Jan. 11, 1961, Ser. No. 82,668
1 Claim. (Cl. 325—142)
(Granted under Title 35, U.S. Code (1952), sec. 266)

The invention described herein may be manufactured and used by or for the United States Government for governmental purposes without payment to us of any royalty thereon.

The invention relates to a transmitter and more particularly to a transmitter of the controlled pulse width type.

The present invention provides a matched filter controlled pulse width transmitter and like other controlled pulse width systems, has at its primary utility the adoption to radar systems in order to achieve lower peak transmitted power for the same maximum range, improved range resolution, greater resistance to jamming, and the ability to accurately read the radar targets radial velocity by means of the change in received frequency due to doppler.

The present invention has distinct advantages over the prior art in that the transmitter generates a predetermined frequency modulated waveform. The present system will not be harassed by the instability which is inherent in deviable oscillator types or systems and there will be no phase drifts as in quantized phase compensation systems.

An object of the present invention is to provide a controlled pulse width transmitter having a predetermined frequency modulated output waveform.

Another object of the present invention is to provide a controlled pulse width transmitter wherein the output pulse may be precisely controlled both as to the period and bandwidth thereof.

Still another object of the present invention is to provide a controlled pulse width transmitter having a stable predetermined frequency modulated output pulse.

In the accompanying specification, we shall describe, and in the annexed drawings, show what is at present considered a preferred embodiment of our present invention. It is, however, to be clearly understood that we do not wish to be limited to the exact details herein shown and described as they are for purposes of illustration only, inasmuch as changes therein may be made without the exercise of invention and within the true spirit and scope of the claim hereto appended.

In the drawing there is shown conventional pulse oscillator 12 which may be of the type generally utilized in radar systems. The generated pulse therefrom is of a preselected frequency, $F_0$, and a width of one microsecond. Initially, the generated pulse from pulse oscillator 12 travels through the system by way of output adder line 29 which includes a series of adders so that for the first microsecond the pulse appearing at output terminal 30 is at the input frequency, $F_0$.

The generated pulse also is received by single sideband modulator 14. Simultaneously, single sideband modulator receives a 25 cycle per second signal by way of terminal 13. The output signal from single sideband modulator 14 is passed through one microsecond delay line 15 and is received by adder 16. Therefore, from one microsecond to two microseconds the pulse appearing at output terminal 30 is formed by the generated pulse passing through a one microsecond delay and is at the generated pulse frequency, $F_0$, plus 25 cycles per second. It is to be noted that the combination of terminal 13, single sideband modulator 14, delay line 15, and adder 16 may be referred to as channel 1.

The pulse from adder 16 is fed to single sideband modulator 18. Simultaneously, single sideband modulator 18 receives a 50 cycle per second signal by way of terminal 17. The output signal from single sideband modulator 18 is passed through two microsecond delay line 19 and is then received by adder 20. Therefore, between two and three microseconds, the generated pulse has passed through the two microsecond delay line and the frequency thereof is $F_0$ plus 50 cycles per second. The combination of terminal 17, single sideband modulator 18, delay line 19 and adder 20 is hereafter referred to as channel 2.

The pulses from adder 20 is fed to single sideband modulator 22. Simultaneously single sideband modulator 22 receives a 100 cycles per second signal by way of terminal 21. The output signal from single sideband modulator 22 is passed through four microsecond delay line 23 and is fed to adder 24. It is to be noted that between three and four microseconds the generated pulse has passed through both the one microsecond and the two microsecond delay lines and the pulse at output terminal 30 has the frequency, $F_0$, plus 75 cycles per second. The output pulse from delay line 23 which is received by adder 24 is delayed four microseconds and occurs between four and five microseconds and has the frequency, $F_0$, plus 100 cycles per second. The combination of terminal 21, single sideband modulator 22, delay line 23 and adder 24 is hereafter referred to as channel 3.

In the operation of the transmitter of the present invention which includes channels 1 to 3, there is available at output terminal 30 a pulse which is formed by a series of pulses being added. The series of pulses are the original generated pulse of one microsecond at a frequency of $F_0$; a pulse delayed one microsecond and of a frequency $F_0$, plus 25 c.p.s.; a one microsecond pulse delayed two microseconds and having a frequency, $F_0$, plus 50 c.p.s.; a one microsecond pulse delayed three microseconds with a frequency of $F_0$ plus 75 c.p.s.; and a one microsecond pulse delayed four microseconds with a frequency of $F_0$ plus 100 c.p.s. Thus at output terminal 30, channels 1 to 3 provide, in combination, from a single generated one microsecond pulse with a frequency of $F_0$, an output pulse of five microseconds with a bandwidth of $F_0$ plus a variation of 100 c.p.s.

In the preferred embodiment of the present invention, as illustrated in the drawing, there is shown eleven channels. The operation of the first three channels have been explained in detail. The fourth through the tenth channel operate in a similar manner and each channel has the identical combination of elements except that channels 4 to 10 have lines providing delays of 8, 16, 32, 64, 128, 256 and 512 microseconds, respectively, and the single sideband modulators in aforesaid channels 4 to 10 receive from their respective terminals carrier signals having the frequencies 200, 400, 800, 1600, 3200, 6400 and 12,800 c.p.s., respectively. The eleventh channel is comprised of single sideband modulator 26, terminal 25, delay line 27 and output adder line 16. Final channel eleven receives pulse signals from all the previous channels 1 to 10 and also from pulse oscillator 12 by way of adders. The pulses are applied to single sideband modulator 26. Simultaneously, single sideband modulator 26 receives a 25.6 kc. carrier signal by way of terminal 25. The output signals from single sideband modulator 26 is passed through 1,024 microsecond delay line 27 to adder 28. The output pulse for the transmission system is provided by way of terminal 30. Thus by utilizing the eleven aforementioned channels, there is provided at output terminal 30 a pulse 2048 microseconds long and with a 51.175 kc. bandspread. Both pulse length and bandspread can be increased or decreased, either by increasing or decreasing the number of channels, or by changing the output of the first single sideband modulator, or by changing the amount of delay in the first delay line. Changing of the parameters of the first channel will dictate the parameters of the following channels.

Other objects and advantages of our present invention will readily occur to those skilled in the art to which the same relates.

What is claimed is:

A pulse transmission system comprising means to generate pulses having a predetermined period and frequency, first single sideband modulator means receiving directly said generated pulses, said first modulator means also receiving simultaneously a first modulating signal having a preselected frequency, first means having a preselected delay equal to said period of said generated pulse, said first delay means receiving directly the modulated output signal from said first modulator means, first adder means having two inputs and one output, said first adder means receiving directly at one of said inputs said generated pulse and at the other of said inputs the output signal from said first delay means, second single sideband modulator means receiving directly the output signal from said first adder means, said second modulator means also simultaneously receiving a second modulating signal having double the frequency of said first modulating signal, second means having a preselected delay equal to twice said period of said generated pulse, said second delay means receiving directly the modulated output signal from said second modulator means, and a second adder having two inputs and one output, the first of said inputs receiving directly the output signal from said first adder and the second of said inputs receiving directly the output signal from said second delay means.

References Cited in the file of this patent

UNITED STATES PATENTS

| | | |
|---|---|---|
| 2,522,368 | Guanella | Sept. 12, 1950 |
| 2,920,289 | Meyer | Jan. 5, 1960 |